United States Patent [19]

Roggero et al.

[11] 4,282,337

[45] Aug. 4, 1981

[54] PROCESS FOR PREPARING GRAFT POLYMERS OF α,α'-DISUBSTITUTED-β-PROPIOLACTONES ON ISOBUTYLENE-TRIENE-COPOLYMERS

[75] Inventors: Arnaldo Roggero, S.Donato Mi; Alberto Gandini, Milan, both of Italy

[73] Assignee: Anic S.p.A., Palermo, Italy

[21] Appl. No.: 144,170

[22] Filed: Apr. 25, 1980

[30] Foreign Application Priority Data

May 14, 1979 [IT] Italy ................................ 22641 A/79

[51] Int. Cl.$^3$ ........................ C08F 35/06; C08F 27/12
[52] U.S. Cl. .................................... 525/153; 525/285; 525/300; 525/301; 525/310; 525/370; 525/378
[58] Field of Search ............... 525/153, 370, 285, 310, 525/301, 300

[56] References Cited

U.S. PATENT DOCUMENTS

| | | | |
|---|---|---|---|
| 3,627,837 | 12/1971 | Webb | 525/153 |
| 3,639,519 | 2/1972 | Hsieh et al. | 525/153 |
| 3,846,387 | 11/1974 | Su | 525/313 |
| 3,884,882 | 5/1975 | Caywood | 525/332 |
| 3,897,513 | 7/1975 | Sundet | 525/327 |
| 4,029,718 | 6/1977 | Sundet | 525/386 |
| 4,031,168 | 6/1977 | Sharkey et al. | 525/386 |

*Primary Examiner*—William F. Hamrock
*Attorney, Agent, or Firm*—Morgan, Finnegan, Pine, Foley & Lee

[57] ABSTRACT

Graft-polymers of α,α'-disubstituted β-propiolactones on isobutylene-triene copolymers are prepared by reacting an isobutylene-triene copolymer with maleic anhydride and possibly with other functionalizing agents adapted to introduce acid and ester groups in the copolymer molecule and by neutralizing or hydrolyzing, or both, with a tetraalkylammonium base, said functional groups, said neutralization or hydrolysis, or both, being followed by a grafting reaction with pivalolactone.

12 Claims, No Drawings

PROCESS FOR PREPARING GRAFT POLYMERS OF α,α'-DISUBSTITUTED-β-PROPIOLACTONES ON ISOBUTYLENE-TRIENE-COPOLYMERS

This invention relates to a process for preparing graft polymers of α, α'-disubstituted-β-propiolactones on isobutylenetriene copolymers, particularly copolymers of isobutylene with polyconjugated polyene linear hydrocarbons containing a system of at least three conjugated double bonds. It is known to be possible to synthesise graft polymers of pivalolactone (PVL) on a suitably functionalised polyisobutylene matrix. According to U.S. Pat. No. 4,031,168, this functionalised matrix is obtained in accordance with the following stages:

(1) Synthesising an isobutylene-vinylaromatic compound copolymer (2) Metallating the copolymer of point (1) with the system Li-sec. Butyl-N,N,N',N'-tetramethylethylenediamine (TMEDA)

(3) Reacting the aforesaid polymer (see point 2)) with $CO_2$ to give —COOLi groups, and acidifying to release COOH groups (4) Reacting with tetraalkylammonium bases and then reacting with pivalolactone.

It has now been possible to synthesise said grafts in the following manner, which is convenient in that the procedure comprises only a few stages which are easily carried out:

(a) Synthesising isobutylene-triene copolymers (b) Reacting these copolymers in solution, including without the use of catalysts, with maleic anhydride and/or other suitable agents which allow functionalisation with acid and ester groups (c) Neutralising (in the case of the anhydride and acid groups) and/or hydrolising (in the case of the ester groups) with tetraalkylammonium bases, and then reacting with pivalolactone.

The base polymers (a) of this invention are copolymers of isobutylene with polyconjugated polyene linear hydrocarbons containing a system of at least three conjugated double bonds, and are obtained by using cationic initiators in accordance with the description of U.K. Pat. No. 1,549,645 of 8-9-76.

These copolymers are characterised by the presence in the polymer chain of conjugated diene unsaturations, which give the product special characteristics connected essentially with their high chemical reactivity.

Even though the examples presented relate essentially to the production of isobutylene copolymers, the field of interest also extends to polymers with other olefins or isoolefines, both aliphatic and aromatic, containing from 4 to 10 carbon atoms. The linear polyolefine is constituted by a polyene hydrocarbon containing at least one system of three conjugated double bonds in accordance with the formula

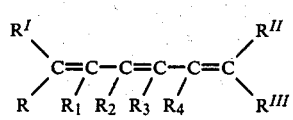

in which R, $R^I$, $R^{II}$, $R^{III}$, $R_1$, $R_2$, $R_3$ and $R_4$, which can be the same or different, can be H or alkyl, alkenyl or aryl radicals containing up to 7 carbon atoms.

Non-limiting examples of olefines which can be used besides isobutene are 3-methyl-1-butene, 4-methyl-1-pentene, styrene and α-methyl styrene. Examples of polyconjugated polyolefines whch can be used either in their pure state or as a mixture of the various geometrical isomers are 2,4,6-octatriene, 2,6-dimethyl-2,4,6-octatriene, 1,6-diphenyl-1,3,5-hexatriene, 1,3,5-heptatriene, 1,3,5-hexatriene, 2,7-dimethyl-2,4,6-octatriene etc.

Certain of these polyeolefines are easily accessible under economically convenient conditions by means of dimerisation reactions followed by isomerisation of the various conjugated diene hydrocarbons (butadiene, isoprene).

The quantity of olefine and/or olefines used can vary from 80 to 99.5%, and the quantity of the polyene consequently varies from 20 to 0.5 mol %.

It is possible to use a wide range of molecular weights between 500 and 2,000,000, but preferably between 1000 and 1,000,000. The aforesaid polymers containing conjugated double bonds are very reactive in Diels Alder, ionic and radical reactions. Even though these latter should not be ignored, where possible, functionalisation reactions via Diels Alder are preferred, as they allow operation under very controlled conditions without the use of catalysts.

The suitable dienophilic agent (maleic anhydride, acrylic and/or methacrylic esters, acrylic and/or methacrylic acid etc.) is then added to the isobutylene-triene copolymers in solution in order to introduce the suitable functional group.

The operation can be carried out at various dienophilic agent/conjugated double bond ratios according to the reactivity of the dienophilic agent used.

With stronger dienophilic agents, it is also possible to reach stoichiometric ratios, this enabling a functionalised product to be obtained which does not require further purification. If a ratio exceeding the stoichiometric is used in order to accelerate or promote the reaction, the functionalised product must be purified before passing to the next stage. Purification is carried out by precipitating the polymer solution with acetone or alcohol, in which the excess of dienophilic agent is nearly always soluble.

Isobutylene products containing reactive conjugated unsaturations can also be synthesised by catalytic dehydrohalogenation of chlorobutyl rubber. In this case, not all the conjugated unsaturations present in the base polymer are Diels Alder reactive, and functionalisation is therefore incomplete.

The functionalised polymers dissolved in the appropriate solvent (aliphatic, aromatic, cycloaliphatic, alkylaromatic or polar) or their mixtures are treated with tetraalkylammonium hydroxides in order, according to the functional group present, to either neutralise or hydrolise the functionalised centre, which thus becomes active for grafting the lactone monomers. The grafting reaction is carried out at a temperature of between −80° C. and 200° C., and preferably at a temperature of between 20° and 120° C. The feed of lactone monomer is determined according to the type of product which is to be obtained, taking account of the fact that as the grafting yield is quantitative, the final product will have a composition (ratio of hard to soft phase) which strictly depends on the feed. The solvents in which the operation is carried out are those mentioned heretofore, but in particular mixtures of toluene and tetrahydrofuran are used.

The graft polymers of the invention are thermoplastic solids, usually of elastomer type. If the lactone content (pivalolactone) exceeds 50%, they are more plastic than elastic, whereas those having a hard phase content of ≦40% are elastic. A wide range of products can be obtained with different properties. Besides being thermoplastic, the elastomer products have good resistance to oxidative degradation.

The invention is clearly illustrated by the following examples, which are non-limiting.

EXAMPLES 1–4

Isobutylene-triene copolymerisation tests were carried out in the manner described. The relative data are shown in table 1. The described copolymers were treated in a toluene solution with maleic anhydride under the conditions stated in table 2.

TABLE 1

| | TRIENE | | SOLVENT | | CATALYST | | Yield | M.W. | Triene in the copolymer |
|---|---|---|---|---|---|---|---|---|---|
| Symbol | TYPE | g | TYPE | ml | TYPE | m.moles | g | g/mole | moles/kg |
| POL 1 | 1,3,5-HEXATRIENE | 0.05 + 0.9 divided | METHYLCYCLOHEXANE CH$_3$Cl | 50 35 | AlEt Cl$_2$ | 0.8 | 14.4 | 380,000 | 0.60 |
| POL 2 | 1,3,5-HEXATRIENE | 0.9 | HEPTANE CH$_3$Cl | 50 35 | AlEt Cl$_2$ | 0.6 | 14.6 | 385,000 | 0.39 |
| POL 3 | 1,3,5-HEXATRIENE | 0.5 | HEPTANE CH$_3$Cl | 50 35 | AlEt$_{1.5}$Cl$_{1.5}$ | 0.5 | 15.2 | 390,000 | 0.22 |
| POL 4 | 2,4,6-OCTATRIENE | 0.5 + 0.9 divided | METHYLCYCLOHEXANE CH$_3$Cl | 50 35 | AlEt Cl$_2$ | 0.8 | 14.9 | 380,000 | 0.45 |

NOTES:
For each test, 28.4 g of isobutylene were fed and the operation carried out at a temperature of −60° C. for 15 minutes (including the time for drip-feeding the catalyst, which varied from 5 to 7 minutes). The triene was sometimes divided-up by adding it simultaneously to the catalyst.

TABLE 2

| | | | | Functionalised copolymer | |
|---|---|---|---|---|---|
| EX. | Isobutylene-triene copolymer | Maleic anhydride/ triene molar ratio | symbol | $^a$Content of anhydride groups moles/kg | $^b$Residual conjugated double bonds moles/kg |
| 1 | POL 1 | 5 | F 1 | 0.60 | TRACES |
| 2 | POL 2 | 5 | F 2 | 0.38 | TRACES |
| 3 | POL 3 | 5 | F 3 | 0.21 | TRACES |
| 4 | POL 4 | 10 | F 4 | 0.30 | 0.15 |

Experimental conditions:
5 g of isobutylene-triene copolymer were dissolved in 250 cm$^3$ of toluene and treated with maleic anhydride for 4 hours at a temperature of 110° C.
$^a$I.R. data, absorption at 1848 and 1773 cm$^{-1}$
$^b$U.V. data, absorption at 235 n.m.

EXAMPLES 5–12

The polymers functionalised with the anhydride group of examples 1, 2, 3 and 4 were dissolved in toluene-THF (volume ratio 1/1) and treated with the required quantity of tetrabutylammonium hydroxide (TBA-OH). After a certain time, the pivalolactone was added at 60° C. under strong stirring. Progressive gelling of the initial solution was noticed. At the end (2 hours), it was treated with concentrated HCl and alcohol. The complete data are shown in table 3.

TABLE 3

| EX. | $^a$Functionalised copolymer | $^b$TBA—OH moles . 10$^{-3}$ | PVL MON g | Symbol | GRAFTS Yield g | $^c$PVL % weight |
|---|---|---|---|---|---|---|
| 5 | F 1 | 2.0 | 1.1 | G 1 | 6.1 | 18 |
| 6 | F 1 | 2.0 | 2.2 | G 2 | 7.2 | 30 |
| 7 | F 2 | 1.2 | 1.1 | G 3 | 6.1 | 17 |
| 8 | F 2 | 1.2 | 2.2 | G 4 | 7.2 | 29 |
| 9 | F 3 | 0.7 | 1.1 | G 5 | 6.1 | 16 |
| 10 | F 3 | 0.7 | 2.2 | G 6 | 7.2 | 30 |
| 11 | F 4 | 0.9 | 1.1 | G 7 | 6.1 | 18 |
| 12 | F 4 | 0.9 | 2.2 | G 8 | 7.2 | 31 |

NOTES:
$^a$5 g of functionalised copolymer were dissolved in 150 cm$^3$ of toluene and 150 cm$^3$ of THF
$^b$0.8 M solution in methanol
$^c$From I.R. and analytical C and H data.
A technological evaluation of samples G 5 and G 6 gave the results shown in table 4.

TABLE 4

| $^a$Sample | SSL g/mole | HSL g/mole | M 100% MPa | M 300% MPa | CR MPa | AR % |
|---|---|---|---|---|---|---|
| G 5 | 4,600 | 830 | 2.8 | 5.2 | 11.8 | 520 |
| G 6 | 4,600 | 1980 | 4.4 | 9.1 | 16.4 | 500 |

NOTE:
Samples G 5 and G 6 were moulded for 10 and 5 minutes respectively at 205 and 220° C.

EXAMPLE 13

5 g of chlorobutyl rubber (1.3% by weight of chlorine) were treated with Zn naphthenate, naphthenic acid and CaO in accordance with U.S. Pat. No. 3,816,271, to give 4.8 g of rubber containing conjuated diene unsaturations determinable in the range 228–245 n.m. The residual chlorine quantity was 0.41%.

This product was reacted in a toluene solution at 110° C. with an excess (4 times) of maleic anhydride for eight hours.

After purification, the product obtained still showed the presence of conjugated unsaturations and an anhydride group content of 0.2 moles/kg.

The functionalised product (4.8 g) was treated in a THF-toluene solution (150+150 cm$^3$) with $0.7 \times 10^{-3}$ moles of TBA-OH, and 1 g of PVL was then added, the reaction being carried out at 60° C. for two hours. 5.7 g of graft copolymer were isolated containing 17.6% by weight of PVL.

EXAMPLE 14

5 g of the copolymer POL 1 of table 1 were treated with methyl acrylate (acrylate/conjugated double bond molar ratio=5) in toluene, operating at 110° C.

After eight hours, a product was isolated containing a chain of ester groups to an extent of 0.58 moles/kg, absorption at 235 n.m. being almost completely absent.

Operating as heretofore described, $2.8 \times 10^{-3}$ moles of TBA-OH were added and the mixture allowed to react for two hours at 70° C. The PVL (1 g) was then added, and the procedure continued as heretofore described.

EXAMPLE 15

5 g of POL 1 were treated with $30 \times 10^{-3}$ moles of acrylic acid at 110° C. in toluene for two hours. If methacrylic acid is used, then longer times are necessary. 5 g of polymer were obtained, with a carboxyl group content of 0.59 moles/kg. The PVL was then added as described heretofore.

EXAMPLE 16

Operating with a reactor modified with respect to that used for the synthesis of POL 1, 2, 3 and 4, an isobutylene-1,3,5-hexatriene copolymer of low molecular weight was synthesised. 60 cm$^3$ of methycyclohexane, 20 cm$^3$ of methylene chloride, 28.4 g of isobutylene and 0.9 g of 1,3,5-hexatriene were fed, and the reaction was carried out at $-10°$ C. 0.8 moles of AlEtCl$_2$ were then introduced, and the mixture polymerised for fifteen minutes. 8.8 g of copolymer were isolated having a molecular weight of 10,000 and a conjugated unsaturation content of 0.38 moles/kg. By reaction with maleic anhydride, a functionalised polymer was obtained with 0.38 moles/kg of anhydride groups.

The subsequent grafting reaction was carried out by firstly treating with $2.0 \times 10^{-3}$ moles of tetrabutylammonium hydroxide, then allowing it to react at ambient temperature for fifteen minutes, and finally adding 2 g of $\alpha,\alpha'$-di-n-propyl-$\beta$-propiolactone. After six hours of reaction at 60° C., 10.7 g of polymer were isolated, the yield being practically quantitative.

We claim:

1. A process for preparing graft polymers of $\alpha,\alpha'$-dialkylsubstituted $\beta$-propiolactones which comprises reacting a copolymer of isobutylene and a polyconjugated polyene linear hydrocarbon containing at least three conjugated double bonds with a dienophile under Diels-Alder reaction conditions to provide a functionalized copolymer substituted with a group selected from an acid, anhydride or ester group, and then reacting said functionalized copolymer with a $\alpha,\alpha'$dialkylsubstituted $\beta$-propiolactone in a solvent at a temperature of from $-80°$ C. to 20° C., and recovering product.

2. A process as claimed in claim 1 wherein said functionalized copolymer, substituted with an acid or anhydride group, is treated with a tetraalkylammonium base in an amount to neutralize said acidic groups.

3. A process as claimed in claim 2 wherein said tetraalkylammonium base is tetrabutylammonium hydroxide.

4. A process as claimed in claim 1 wherein said functionalized copolymer, substituted with an ester group, is treated with a tetraalkylammonium base in an amount to hydrolyze said ester groups.

5. A process as claimed in claim 4 wherein said tetraalkylammonium base is tetrabutylammonium hydroxide.

6. A process as claimed in claim 1 wherein said polyconjugated polyene linear hydrocarbon is selected from 2,4,6-octatriene, 2,6-dimethyl-2,4,6-octatriene, 1,6-diphenyl-1,3,5-hexatriene, 1,3,5-heptatriene, 1,3,5-hexatriene or 2,7-dimethyl-2,4,6-octatriene.

7. A process as claimed in claim 1 wherein said dienophile is selected from maleic anhydride, acrylic acid esters, methacrylic acid esters, acrylic acid or methacrylic acid.

8. A process as claimed in claim 1 wherein said copolymer is obtained by the catalytic dehydrohalogenation of chlorobutyl rubber.

9. A process as claimed in claim 1 wherein said $\alpha,\alpha'$-dialkylsubstituted $\beta$-propiolactone is selected from $\alpha,\alpha$-dimethyl-$\beta$-propiolactone (pivalolactone) or $\alpha,\alpha$-di-n-propyl-$\beta$-propiolactone.

10. A process as claimed in claim 1 wherein said solvent is selected from an aliphatic, aromatic, cycloaliphatic or alkylaromatic hydrocarbon solvent or a polar solvent or mixtures thereof.

11. A process as claimed in claim 10 wherein said solvent is a mixture of toluene and tetrahydrofuran.

12. A process as claimed in claim 1 wherein said temperature is between 20° C. and 120° C.

* * * * *